United States Patent [19]

Dowbenko et al.

[11] Patent Number: 4,550,137

[45] Date of Patent: Oct. 29, 1985

[54] LACTAM DERIVED SALTS OF SULFONIC ACIDS AS LATENT ACID CATALYSTS

[75] Inventors: Rostyslaw Dowbenko, Gibsonia; Barbara A. Greigger, Allison Park, both of Pa.

[73] Assignee: PPG Industries, Inc., Pittsburgh, Pa.

[21] Appl. No.: 479,604

[22] Filed: Mar. 28, 1983

[51] Int. Cl.$^4$ ................................................. C08F 4/22
[52] U.S. Cl. ........................................ 525/31; 525/32; 525/162; 525/438; 525/443
[58] Field of Search ................... 525/31, 32, 438, 443, 525/162

[56] References Cited

U.S. PATENT DOCUMENTS

| | | | |
|---|---|---|---|
| 2,141,893 | 12/1938 | Zitscher et al. | 260/505 |
| 2,227,708 | 1/1941 | Cordier | 260/71 |
| 2,961,424 | 11/1960 | Mueller et al. | 260/45.2 |
| 3,293,324 | 12/1966 | Tropp et al. | 260/850 |
| 3,384,606 | 5/1968 | Dieterich et al. | 260/29.4 |
| 3,474,054 | 10/1969 | White | 260/15 |
| 3,732,273 | 5/1973 | Heine et al. | 260/456 R |
| 3,798,262 | 3/1974 | Ziegler et al. | 260/505 R |
| 3,840,591 | 10/1974 | Lee et al. | 260/505 R |
| 3,842,021 | 10/1974 | Grant et al. | 260/15 |
| 3,907,706 | 9/1975 | Robins | 252/431 |
| 3,979,478 | 9/1976 | Gallacher | 260/850 |
| 4,038,198 | 7/1977 | Wagner et al. | 528/48 |
| 4,192,826 | 3/1980 | Beresniewicz et al. | 525/425 |
| 4,200,729 | 4/1980 | Calbo | 525/398 |
| 4,247,461 | 1/1981 | Lin et al. | 260/239.1 |
| 4,281,075 | 7/1981 | Chattha | 525/110 |
| 4,350,790 | 9/1982 | Chattha | 525/110 |

FOREIGN PATENT DOCUMENTS

| | | |
|---|---|---|
| 0033038 | 12/1980 | European Pat. Off. |
| 2229364 | 1/1974 | Fed. Rep. of Germany |
| 57-63357 | 4/1982 | Japan |
| 57-63358 | 4/1982 | Japan |
| 1361929 | 7/1974 | United Kingdom |
| 1413054 | 11/1975 | United Kingdom |
| 1560821 | 2/1980 | United Kingdom |

OTHER PUBLICATIONS

Muramatu, Onishi, Makino, Fujii and Yamamura, "Inhibition of Caseinolytic Activity of Plasmin by Various Synthetic Inhibitors", Journal of Biochemistry, vol. 57, No. 3, 1965, pp. 402 to 406.

Muramatu, Onishi, Makino, Hayakumo and Fujii, "Inhibition of Tryptic Activity by Various Synthetic Inhibitors", Journal of Biochemistry, vol. 8, No. 3, 1965, pp. 214 to 226.

Matar and Mekkawy, "The Effect of Ring Size and 2-Methyl Substituents on the Rate of Elimination of Cycloalkyl Tosylates in Dimethyl Sulphoxide", Indian J. Chem., vol. 13, May 1975, pp. 530–531.

Kotani, "Pyrolysis and Acetolysis of Some Sulfonic Esters, Bulletin of the Chemical Society of Japan, vol. 39, Aug. 1966, pp. 1767–1773.

Matar and Mekkawy, "Effect of Ring Size and 2--Methyl Substituents on the Rate of Elimination of Cycloalkyl Tosylates in Dimethyl Sulfoxide", J. Indian Chem. Soc., vol. LI, Sep. 1974, pp. 839–840.

*Primary Examiner*—Joseph L. Schofer
*Assistant Examiner*—Bernard Lipman
*Attorney, Agent, or Firm*—Linda Pingitore

[57] ABSTRACT

In a curable composition capable of acid catalyzed crosslinking and having as its principal components an active hydrogen-containing resin, a crosslinking agent present externally and/or internally as a part of the active hydrogen-containing resin, and an acid catalyst, cure can be readily attained by using as the acid catalyst, a catalytic amount of a latent acid catalyst which is the reaction product of a member selected from a lactam, an amino acid, an amino ester and an aminoalkyl ester; an alcohol or water; and a member selected from a sulfonic acid, sulfuric acid, and phosphoric acid.

24 Claims, No Drawings

LACTAM DERIVED SALTS OF SULFONIC ACIDS AS LATENT ACID CATALYSTS

BACKGROUND OF THE INVENTION

The present invention relates to the use of latent acid catalysts in coating compositions.

Coating compositions which are capable of acid catalyzed crosslinking generally contain a catalytic amount of an acid catalyst. The acid catalyst is added in order to accelerate crosslinking and thereby reduce the overall time required for cure. When an acid catalyst is utilized, it is advantageous to have the catalyst present as the free acid since in this manner a rapid cure can be efficiently achieved. However, the presence of the free acid may also cause problems in storage stability; that is, the coating composition will exhibit a tendency to gel and harden during the storage term, thus becoming unfit for use.

As a means of circumventing these difficulties, latent or blocked acid catalysts are often utilized to delay the action of crosslinking agents and otherwise postpone the curing mechanism.

Latent acid catalysts are formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts are activativated by heating.

SUMMARY OF THE INVENTION

In accordance with the present invention there is provided an improved curable composition as follows. In a curable composition which is capable of acid catalyzed crosslinking, comprising an active hydrogen-containing resin, a crosslinking agent present externally and/or internally as a part of the active hydrogen containing resin, and an acid catalyst, wherein the improvement in curing comprises using as the acid catalyst a catalytic amount of a latent acid catalyst represented by either of the following structural formulas:

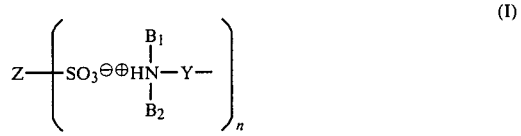

(I)

(II)

wherein:

Z is a $C_1$ to $C_{12}$ aliphatic radical, a $C_5$ to $C_{12}$ cycloaliphatic radical, or a $C_6$ to $C_{28}$ aromatic radical; $B_1$ and $B_2$ are independently hydrogen, a $C_1$ to $C_{18}$ aliphatic radical, a $C_5$ to $C_{12}$ cycloaliphatic radical, or a $C_6$ to $C_{10}$ aromatic radical;

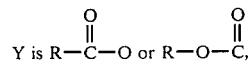

wherein

R is a $C_2$ to $C_{12}$ alkylene radical, or a $C_8$ to $C_{16}$ arylene radical;

A is $SO_4^{-2}$, $HSO_4^-$, $PO_4^{-3}$, $HPO_4^{-2}$, or $H_2PO_4^-$;

n is an integer from 1 to 3; and m is an integer from 1 to 3.

The latent acid catalysts of the present invention are the reaction product of a member selected from the group consisting of a lactam, an amino acid, an amino ester and an aminoalkyl ester; an alcohol or water; and a member selected from the group consisting of a sulfonic acid, sulfuric acid, and phosphoric acid.

DETAILED DESCRIPTION OF THE INVENTION

The latent acid catalysts of the present invention can be represented by the following structural formulas:

(I)

(II)

In the above formula (I) Z is a radical derived from a sulfonic acid and includes $C_1$ to $C_{12}$ aliphatic radicals, $C_5$ to $C_{12}$ cycloaliphatic radicals, and $C_6$ to $C_{28}$ aromatic radicals. The aforesaid aliphatic, cycloaliphatic, and aromatic radicals can also be substituted with a variety of substituents so long as the substituents do not detract from the properties of the latent acid catalyst. For example, $C_1$ to $C_{20}$ alkyl groups and a COOH group are quite useful herein. Exemplary of radicals represented by Z include methyl, para-tolyl, benzyl, phenyl, ethylphenyl, dodecylphenyl, napthyl, dinonylnaphthyl, and trifluoromethyl. Preferably Z is methyl, para-tolyl, dodecylphenyl, or dinonylnaphthyl. Since n in the above formula is an integer from 1 to 3 the sulfonic acid from which the aforesaid Z radical is derived can be a mono-, di-, or trisulfonic acid. For example, suitable, sulfonic acids include methanesulfonic acid, para-toluenesulfonic acid, dodecylbenzene sulfonic acid, dinonylnaphthalene disulfonic acid, and 1,3,6-naphthalene trisulfonic acid (derived from the commercially available trisodium salt).

$B_1$ and $B_2$ can be independently hydrogen, a $C_1$ to $C_{18}$ aliphatic radical, a $C_5$ to $C_{12}$ cycloaliphatic radical, or a $C_6$ to $C_{10}$ aromatic radical. Preferably $B_1$ and $B_2$ are both hydrogen.

Y in the above formulas is a bivalent radical represented by the following structural formulas:

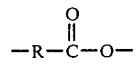

or

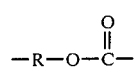

wherein

R is a $C_2$ to $C_{12}$ alkylene radical or a $C_8$ to $C_{16}$ arylene radical.

It can be derived from a lactam which has been ring opened with an alcohol or water or alternatively it can be derived from any naturally occurring amino acid or from an amino ester or an aminoalkyl ester. Exemplary of suitable lactams from which Y can be derived include epsilon-caprolactam (6-hexanelactam), valerolactam (5-pentanelactam), 2-pyrrolidinone (4-butanelactam), N-methyl 2-pyrrolidinone (N-methyl 4-butanelactam) and 2-azacyclotridecanone (12-dodecanelactam). Exemplary of amino acids include lysine, glycine, alananine, and valine and useful amino esters include esters of these amino acids, for example, the methyl ester of lysine. In one embodiment dimethylaminoethylmethacrylate is used as an aminoalkyl ester. Preferably Y is derived from a lactam, the preferred lactam being epsilon-caprolactam (6-hexanelactam).

In the above formula (II) A can be $SO_4^{-2}$, $HSO_4^{-}$, $PO_4^{-3}$, $HPO_4^{-2}$, or $H_2PO_4^{-}$, the $SO_4^{-2}$ and $HSO_4^{-}$, representing sulfuric acid and the remaining groups representing phosphoric acid which are also quite useful herein.

The latent acid catalysts of the present invention are preferably the reaction product of a lactam, an alcohol or water, and a sulfonic acid. Alternatively, in place of a lactam, an amino acid, amino ester, or aminoalkyl ester can be utilized, and in place of a sulfonic acid one can utilize sulfuric acid or phosphoric acid. They can be prepared, for example, by admixing together the lactam, alcohol, and sulfonic acid and heating these materials to reflux under an inert atmosphere such as nitrogen. Generally temperatures ranging from about 0° C. to about 200° C. are utilized although preferably temperatures from 70° C. to 160° C. are used. The progress of the reaction is generally monitored by repeated acid value determinations and the reaction is considered completed when acid value determinations indicate that a substantially constant acid value is obtained. Generally a period of time ranging from about 2 hours to 48 hours is required to complete the reaction. Upon completion of the reaction the product mixture is cooled and typically dissolved in a suitable solvent such as methanol to reduce solids content.

Lactams are derivatives of amino carboxylic acids and contain the grouping —CONB—, wherein B can be, for example, hydrogen or a substituted or unsubstituted alkyl or aryl radical. They are, therefore, unlike conventional materials, such as amines, heretofore utilized to produce latent sulfonic acids.

The use of the latent acid catalysts of the present invention in curable compositions is novel and advantageous. Coating compositions cured in the presence of these catalysts result in films which exhibit good hardness and solvent resistance as well as gloss, and in addition the films have been observed to be resistant to wrinkling.

Lactams which are suitable in preparing the latent acid catalysts of the present invention have been listed above and can be represented by the following structural formula:

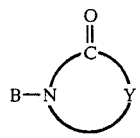

Y in the above formula includes $C_3$ to $C_{12}$ alkylene radicals and $C_8$ to $C_{16}$ arylene radicals. These radicals can also be substituted with various substituents so long as the properties of the latent acid catalyst are not detrimentally affected. For example, $C_1$ to $C_{20}$ alkyl groups can be used. Examplary of radicals represented by Y include propylene, butylene, pentylene and nonylene.

As has been stated above an amino acid, amino ester, or aminoalkyl ester can be utilized in place of a lactam. Examples of these materials which can be used have been set forth above.

B is a hydrogen atom, a $C_1$ to $C_{18}$ aliphatic radical, a $C_5$ to $C_{12}$ cycloaliphatic radical or a $C_6$ to $C_{10}$ aromatic radical. Preferably B is hydrogen.

The alcohols suitable in preparing the latent acid catalysts of this invention are preferably monofunctional alcohols represented by the following structural formula:

R in the above formula can be a $C_1$ to $C_{18}$ aliphatic radical, a $C_5$ to $C_{18}$ cycloaliphatic radical, a $C_6$ to $C_{18}$ aromatic radical, or a $C_5$ to $C_{10}$ heterocyclic radical. These radicals can also be substituted with a variety of substituents so long as they do not detract from the properties of the latent acid catalyst. For example, $C_1$ to $C_{20}$ alkyl groups are excellent substituents. Examplary of radicals represented by R include methyl, ethyl, propyl, n-butyl, isobutyl, cyclohexyl, benzyl, and tetrahydrofurfuryl. Preferably, R is methyl, n-butyl, or isobutyl. Examplary of suitable alcohols include methanol, ethanol, propanol, butanol, isobutanol, cyclohexanol, benzyl alcohol, and tetrahydrofurfural alcohol.

The sulfonic acids suitable herein can be represented by the following structural formula:

wherein Z is as has been defined above. Examples of sulfonic acids which are representative of the above formula have also been listed above.

Also useful herein are sulfuric acid, $H_2SO_4$, and phosphoric acid, $H_3PO_4$, both of which can be used in place of a sulfonic acid to prepare the latent acid catalysts of the present invention.

Examples of useful latent acid catalysts according to the present invention include [(5-butoxycarbonyl)pentyl]ammonium tosylate; [(4-butoxycarbonyl)butyl]ammonium tosylate; [(5-methoxycarbonyl)pentyl]ammonium tosylate; [3-butoxycarbonyl)propyl]ammonium tosylate; [(5-butoxycarbonyl)pentyl]ammonium dodecylbenzenesulfonate; [(11-butoxycarbonyl)undecyl]ammonium tosylate; di[[(5-isobutoxycarbonyl)pentyl]ammonium]dinonylnaphthalenedisulfonate; [(5-butoxycarbonyl)pentyl]ammonium sulfate; [(5-butoxycarbonyl)pentyl]ammonium hydrogen phosphate; [(5-butoxycarbonyl)pentyl]ammonium phosphate; and dimethylaminoethylmethacrylate para-toluenesulfonate. A preferred catalyst is [(5-butoxycarbonyl)pentyl]ammonium tosylate.

The curable compositions useful with the latent catalysts of the present invention are capable of acid catalyzed crosslinking and comprise in addition to the catalyst an active hydrogen-containing resin, and a crosslinking agent present externally and/or internally as a part of the active hydrogen-containing resin. The active hydrogen-containing resin is preferably a polymeric polyol having an acid value within the range of from about 0 to 30 and a hydroxyl number ranging from about 50 to 300. Examples of useful polymeric polyols include polyester polyols and acrylic polyols.

Polyester polyols are generally formed by the esterification of polyols with polycarboxylic acids or acid anhydrides. The polyols conventionally employed in making the polyester polyols include alkylene glycols, such as ethylene glycol, propylene glycol, butylene glycol and neopentyl glycol, and other glycols such as hydrogenated bisphenol A, cyclohexane-dimethanol, caprolactone-diol reaction products, hydroxyalkylated bisphenols, polyether glycols, e.g., poly(oxytetramethylene)glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins.

Suitable carboxylic acids used in the reaction with the above-described polyols include phthalic, isophthalic, terephthalic, tetrahydrophthalic, hexahydrophthalic, adipic, azelaic, sebacic, maleic, glutaric, tetrachlorophthalic, fumaric, itaconic, malonic, suberic, 2-methylsuccinic, 3,3-diethylglutaric, 2,2-dimethylsuccinic acid and trimellitic acid. Anhydrides of these acids where they exist can also be employed and are encompassed by the term "carboxylic acid". Monocarboxylic acids such as benzoic acid and hexanoic acid can also be used, provided the average functionality of the polyol is above about 2.0. Saturated acids (including those aromatic acids where the only unsaturation is in the aromatic ring) are preferred.

It is also possible to produce polyester polyols containing one or two alkylene oxide groups per hydroxy group and preferably no more than three alkylene oxide groups per ester group. The alkylene oxide-derived polyester polyol can be produced by substituting an alkylene oxide-derived polyol for all or part of the polyol component used to produce the polyester polyol. Useful alkylene oxide-derived polyols include diethylene glycol, triethylene glycol, dipropylene glycol, tetraethylene glycol, 2,2-bis(hydroxyethoxyphenyl)propane and 2,2-bis(beta-hydroxypropoxyphenyl)propane. These polyester polyols can also be produced by oxalkylating any one of the above-described polyester polyols.

Polyester polyols can also be made from the reaction of a lactone with a polyol. The lactones, commercially available, are represented by the structure:

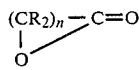

wherein n is from 2 to 9 and the R's are hydrogen, alkyl, cycloalkyl, alkoxy and single ring aromatic hydrocarbon radicals. Preferred lactones are the epsilon-caprolactones where n equals 5. Polyols, such as the above-described diols and triols are used in the reaction with the lactone.

Acrylic polyols comprising the hydroxyalkyl esters of ethylenically unsaturated carboxylic acids and at least one other ethylenically unsaturated monomer copolymerizable therewith are also used herein. Preferred interpolymers of the class described are those containing hydroxyalkyl esters in which the alkyl group has up to about 18 carbon atoms. Especially preferred esters are acrylic acid and methacrylic acid esters of ethylene glycol and 1,2-propylene glycol, i.e., hydroxyethyl acrylate and methacrylate, and hydroxypropyl acrylate and methacrylate. However, there may also be employed similar esters of other unsaturated acids, for example, ethacrylic acid, crotonic acid, and similar acid having up to about 6 carbon atoms, as well as esters containing other hydroxyalkyl radicals, such as hydroxybutyl esters and hydroxylauryl esters.

In addition to esters of unsaturated monocarboxylic acids, there may be employed the mono- or diesters of unsaturated dicarboxylic acids, such as maleic acid, fumaric acid and itaconic acid, in which at least one of the esterifying groups is hydroxyalkyl. Such esters include bis-(hydroxyalkyl)esters, as well as various other alkylene glycol esters of such acids and mixed alkyl hydroxyalkyl esters, such as butyl hydroxyethyl maleate and benzyl hydroxypropyl maleate. The corresponding monoesters, such as the mono(hydroxyethyl), mono(hydroxypropyl), and similar alkylene glycol monoesters of maleic acid and similar acids, can also be used.

The monomer or monomers with which the hydroxyalkyl ester is interpolymerized can be any ethylenic compound copolymerizable with the ester, the polymerization taking place through the ethylenically unsaturated linkages. These include monoolefinic and, in minor amounts, polyolefinic hydrocarbons, halogenated monoolefinic and diolefinic hydrocarbons, unsaturated esters of organic and inorganic acids, esters or amides of unsaturated acids, nitriles, unsaturated acids, and the like. Examples of such monomers include styrene; 1,3-butadiene; 2-chlorobutene; acrylonitrile; alpha-methyl styrene; alpha-chlorostyrene; 2-chlorobutadiene; 1,1-dichloroethylene; vinyl butyrate; vinyl acetate; vinyl chloride; allyl chloride; dimethyl maleate; divinyl benzene; diallyl itaconate; triallyl cyanurate; and the like. The preferred monomers are acrylates and methacrylates, such as ethyl acrylate, propyl acrylate, ethylhexyl acrylate, acrylamide, methyl methacrylate, butyl methacrylate, and the like, as well as methacrylic and acrylic acid.

Another important class of acrylic resins that can be used comprises the crosslinking carboxylic acid-containing polymers. The carboxylic acid polymers that are used herein contain from about 3 to about 40 percent by weight of polymerizable ethylenically unsaturated acid. The ethylenically unsaturated acids which may be used are those such as acrylic acid, methacrylic acid, fumaric acid, maleic acid, and itaconic acid. These polymerizable ethylenically unsaturated acids may be polymerized with the other monomers mentioned above.

The aforedescribed polyols require a crosslinking or curing agent to cure to a durable film. The crosslinking agent may be present externally or internally as part of the active hydrogen containing resin. Examples of external curing agents are aminoplast resins or phenoplast resins, with the aminoplast resins being preferred.

Aminoplast resins are based on the addition products of formaldehyde, with an amino- or amido-group carrying substance. Condensation products obtained from the reaction of alcohols and formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandimide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like.

While the aldehyde employed is most often formaldehyde, other similar condensation products can be made from other aldehydes, such as acetaldehyde, crotonaldehyde, acrolein, benzaldehyde, furfural, glyoxal and the like.

The aminoplast resins contain methyol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as Cellosolves and Carbitols, and halogen-substituted or other substituted alcohols, such as 3-chloropropanol and butoxyethanol. The preferred aminoplast resins are substantially alkylated with methanol or butanol.

The phenolic resins which may be used as curing agents herein are formed by the condensation of an aldehyde and a phenol. The most used aldehyde is formaldehyde, although other aldehydes, such as acetaldehyde, can also be employed. Methylene-releasing and aldehyde-releasing agents such as paraformaldehyde and hexamethylene tetramine, can be utilized as the aldehyde agent if desired. Various phenols can be used; for instance, the phenol employed can be phenol per se, a cresol, or a substituted phenol in which a hydrocarbon radical having either a straight chain, a branched chain or a cyclic structure is substituted for a hydrogen in the aromatic ring. Mixtures of phenols are also often employed. Some specific examples of phenols utilized to produce these resins include p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain. A common phenolic resin is phenol formaldehyde.

The curing agent can also be part of the hydrogen-containing resin. Examples of resins of this type are interpolymers of an N-alkoxymethyl substituted unsaturated carboxylic acid amide with at least one other monomer having a

group, said interpolymers being characterized by having amido hydrogen atoms replaced by the structure —RCHOR$_1$, wherein R is selected from the group consisting of hydrogen and saturated lower aliphatic hydrocarbon radicals and R$_1$ is a member of the class consisting of hydrogen and lower alkyl radicals. In general, these interpolymers can be produced in two ways. In the first method, the unsaturated carboxylic acid amide chosen is an N-alkoxymethyl acrylamide (i.e., a material having an —NHRCHOR$_1$ group in the molecule). This N-alkoxymethyl acrylamide is then polymerized with at least one other monomer having a

group to produce a useful interpolymer. In the second method, an unsaturated carboxylic acid amide, e.g., acrylamide is polymerized with at least one other monomer having a

group and is then reacted with an aldehyde to form a useful interpolymer.

Examples of useful interpolymers and their method of manufacture are disclosed in U.S. Pat. Nos. 2,978,437; 3,037,963 and 3,079,434.

Additionally useful herein are a class of interpolymers of N-alkoxymethyl substituted unsaturated carboxylic acid amides, especially N-alkoxymethyl acrylamides as described above, with polyethylenically unsaturated polyesters. The amido nitrogens of such an interpolymer are replaced by the structure —RCHOR$_1$, wherein R can be hydrogen or saturated lower aliphatic hydrocarbon radicals and R$_1$ can be hydrogen or a $C_1$-$C_{10}$ aliphatic hydrocarbon radical. Any number of unsaturated polyesters may be utilized so long as they are polyethylenically unsaturated.

Both of the aforesaid classes of interpolymers are capable of crosslinking without the necessity of adding external crosslinking resin. It is noted that although an external crosslinking resin is not necessary for those aforedescribed interpolymers capable of internal crosslinking, satisfactory results are attainable if an external curing agent is also added. For this purpose, the aminoplast and phenoplast crosslinking resins described above can be utilized.

When added externally, the crosslinking resin is present in an amount of from about 5 percent to about 50 percent by weight based on the total weight of the resinous components of composition. When the curing agent is present internally it is present in an amount of from about 5 to 25 percent by weight of the interpolymer.

The latent acid catalysts of the claimed invention are utilized in a catalytic amount; that is, an amount sufficient to accelerate the cure of a coating composition to a commercially acceptable rate. Typically, the catalyst is present in an amount ranging from about 0.1 percent to about 10 percent by weight based on the total weight of the resinous components of composition. The catalyst can be utilized either as it is prepared and dissolved in a suitable solvent such as methanol or the catalyst can be utilized in its purified form. In a preferred embodiment the latent acid catalysts of the present invention are utilized as they are prepared and dissolved in methanol.

In addition to the aforedescribed components, the coating compositions of the present invention ordinarily contain other optional ingredients such as pigments, fillers, plasticizers, flow control agents and other formulating additives. The compositions are typically contained in a solvent which can be any solvent or solvent mixture in which the materials employed are compatible and soluble to the desired extent. For example, suitable solvents include methyl amyl ketone, xylene, toluene, methyl ethyl ketone, methyl isobutyl ketone, ethylene glycol monoethyl ether, and ethylene glycol monobutyl ether.

The coating compositions herein can be applied in any conventional manner, including brushing, flow coating, spraying, and the like. They are preferably intended for application on metallic substrates although they can readily be applied over any substrate.

The claimed coating compositions can be cured over a wide range of temperatures depending upon the resin system chosen. Typically they are cured at a temperature of from about 95° C. to 190° C. for a period of from 10 to 30 minutes.

In addition to use in coating compositions, the latent acid catalysts of the present invention are also useful in other curable compositions such as molding and laminating compositions.

The following examples are submitted for the purpose of further illustrating the nature of the present invention and should not be construed as a limitation on the scope thereof. All parts and percentages in the Examples and throughout the specification are by weight unless otherwise indicated.

EXAMPLE I

Preparation of [(5-butoxycarbonyl)pentyl]ammonium tosylate

Into a flask equipped with magnetic stirrer, thermometer, nitrogen inlet tube, addition funnel, and Dean-Stark trap were placed 403.0 parts of epsilon-caprolactm (6-hexanelactam) and 100.0 parts butanol. The lactam solution was placed under nitrogen atmosphere and heated to 120° C. to reflux. Subsequently, a mixture of 679.2 parts of para-toluenesulfonic acid monohydrate and 955.5 parts of butanol was charged to the addition funnel and slowly added to the refluxing 6-hexanelactam solution over a period of 8 hours, keeping the pH of the reaction mixture at 2.5 to 3.5. Refluxing was continued throughout the addition to azeotropically remove any water present. After the addition the reaction mixture was held at reflux. The acid value was determined by dissolving a sample of the reaction mixture in water and titrating with methanolic potassium hydroxide using phenol red indicator which indicates the free acid content. When the acid value was essentially constant the reaction mixture was cooled to 70° C. followed by the addition of 2200.3 parts of methanol over a five minute period. The mixture was stirred for five minutes and filtered to yield the [(5-butoxycarbonyl)pentyl]ammonium tosylate. The aforesaid latent acid catalyst had a 30 percent solids content in methanol and butanol.

EXAMPLE II

Preparation of [(4-butoxycarbonyl)butyl]ammonium tosylate

Into a flask equipped with magnetic stirrer, thermometer, nitrogen inlet tube, and Dean-Stark trap were placed 25.0 parts of valerolactam (5-pentanelactam), 47.8 parts of para-toluenesulfonic acid monohydrate and 74.7 parts of butanol. The aforesaid mixture was placed under nitrogen atmosphere, heated to reflux to azeotropically remove any water present, and maintained at reflux until a constant acid value was attained. (The acid value was determined by the procedure described in Example I, above.) The reaction mixture was allowed to cool to 60° C. followed by the addition of 146.9 parts of methanol. The mixture was stirred and filtered to yield the [(4-butoxycarbonyl)butyl]ammonium tosylate. The aforesaid latent acid catalyst had a solids content of 30 percent in methanol and butanol.

EXAMPLE III

Preparation of [(5-butoxycarbonyl)pentyl]ammonium dodecylbenzenesulfonate

Into a reactor flask equipped with magnetic stirrer, thermometer, nitrogen inlet tube and Dean-Stark trap were placed 48.6 parts of epsilon-caprolactam (6-hexanelactam), 144.0 parts of dodecylbenzene sulfonic acid (98%), and 127.4 parts of butanol. The aforesaid mixture was placed under nitrogen atmosphere, heated to reflux to azeotropically remove any water present, and maintained at reflux until a constant acid value was attained. (The acid value was determined by the procedure described in Example I, above.) The reaction mixture was allowed to cool to 70° C. and was mixed with 418.6 parts of methanol. The resultant mixture was stirred and filtered to yield the [(5-butoxycarbonyl)pentyl]ammonium dodecylbenzenesulfonate. The aforesaid latent acid catalyst had a solids content of 30 percent in methanol and butanol.

EXAMPLE IV

Preparation of [(5-methoxycarbonyl)pentyl]ammonium tosylate

Into a flask equipped with magnetic stirrer, thermometer, nitrogen inlet tube, and reflux condenser were placed 141.7 parts of epsilon-caprolactam (6-hexanelactam), 223.3 parts of anhydrous para-toluenesulfonic acid, and 160.0 parts of methanol. The aforesaid mixture was placed under nitrogen atmosphere, heated to reflux, and maintained at reflux until a constant acid value was attained. (The acid value was determined by the procedure described in Example I, above.) The reaction mixture was allowed to cool to 70° C. followed by the addition of 825.0 parts of methanol. The mixture was stirred and filtered to yield the [(5-methoxycarbonyl)pentyl]ammonium tosylate. The aforesaid latent acid catalyst had a solids content of 30 percent in methanol.

EXAMPLE V

Preparation of [(3-butoxycarbonyl)propyl]ammonium tosylate

Into a reactor flask equipped with magnetic stirrer, thermometer, nitrogen inlet tube, and Dean-Stark trap were placed 47.0 parts of 2-pyrrolidinone (4-butanelactam), 109.4 parts of para-toluenesulfonic acid monohydrate, and 197.4 parts of butanol. The aforesaid mixture was placed under nitrogen atmosphere, heated to reflux to azeotropically remove any water present, and maintained at reflux until a constant acid value was attained. (The acid value was determined by the procedure described in Example I, above.) The reaction mixture was allowed to cool to 60° C. followed by the addition of 280.8 parts of methanol over a five-minute period. The mixture was stirred and filtered to yield the [(3-butoxycarbonyl)propyl]ammonium tosylate. The aforesaid latent acid catalyst had a solids content of 30 percent in methanol and isobutanol.

EXAMPLE VI

Preparation of di[[(5-isobutoxycarbonyl)pentyl]ammonium]dinonylnaphthalenedisulfonate Into a flask equipped with magnetic stirrer, thermometer, nitrogen inlet tube, and reflux condenser were placed 33.4 parts of epsilon caprolactam (6-hexanelactam), 144.1 parts of dinonylnaphthalene disulfonic acid (55% solution in isobutanol), and 22.5 parts of isobutanol. The aforesaid mixture was placed under nitrogen atmosphere, heated to reflux, and maintained at reflux until a constant acid value was attained. (The acid value was determined by the procedure described in Example I, above.) The reaction mixture was allowed to cool to 70° C. followed by the addition of 248.5 parts of methanol over a five minute period. The mixture was stirred and filtered to yield the di[[(5-isobutoxycarbonyl)pentyl]ammonium]dinonylnaphthalenedisulfonate. The aforesaid latent acid catalyst had a solids content of 30 percent in methanol and butanol.

EXAMPLE VII

Preparation of [(5-butoxycarbonyl)pentyl]ammonium sulfate

Into a flask equipped with a magnetic stirrer, thermometer, nitrogen inlet tube, and Dean-Stark trap were placed 226.0 parts of epsilon-caprolactam(6-hexanelactam), 100.0 parts of sulfuric acid and 592.0 parts of butanol. The aforesaid mixture was placed under nitrogen atmosphere, heated to reflux to azeotropically remove any water present, and maintained at reflux until a constant acid value was attained. (The acid value was determined by the procedure described in Example I, above.) The reaction mixture was allowed to cool to 60° C. followed by the addition of 657.3 parts of methanol over a five-minute period. The mixture was stirred and filtered to yield the [(5-butoxycarbonyl)pentyl]ammonium sulfate. The aforesaid latent acid catalyst had a solids content of 30 percent in methanol and butanol.

EXAMPLE VIII

Preparation of [(5-butoxycarbonyl)pentyl]ammonium hydrogen phosphate

Into a flask equipped with a magnetic stirrer, thermometer, nitrogen inlet tube, and Dean-Stark trap were placed 226.0 parts of epsilon-caprolactam (6-hexanelactam), 115.3 parts of phosphoric acid, and 592.0 parts butanol. The aforesaid mixture was placed under a nitrogen atmosphere, heated to reflux to azeotropically remove any water present, and maintained at reflux until a constant acid value was maintained. (The acid value was determined by the procedure described in Example I, above.) The reaction mixture was allowed to cool to 60° C. followed by the addition of 657.3 parts of methanol over a five-minute period. The mixture was stirred and filtered to yield the [(5-butoxycarbonyl)pentyl]ammonium hydrogen phosphate. The aforesaid latent acid catalyst had a solids content of 30 percent in methanol and butanol.

EXAMPLE IX

Preparation of dimethylaminoethylmethacrylate para-toluenesulfonate

Into a flask equipped with a magnetic stirrer, thermometer, and addition funnel were placed 157.0 parts of dimethylaminoethylmethacrylate and 418.0 parts of methanol. The addition funnel was charged with 172.0 parts of anhydrous para-toluenesulfonic acid and 350.0 parts of methanol and this mixture was added to the initially charged ingredients over a period of fifteen minutes, maintaining the temperature below 40° C. The reaction mixture was maintained at ambient temperature for a thirty minute period and adjusted to pH 7.0 by the addition of 10.2 additional parts of dimethylaminoethylmethacrylate. The resultant product mixture was filtered to yield the dimethylaminoethylmethacrylate para-toluenesulfonate. The aforesaid latent acid catalyst had a solids content of 30 percent in methanol.

EXAMPLE X

Preparation of [(5-butoxycarbonyl)pentyl]ammonium phosphate

Into a flask equipped with a magnetic stirrer, thermometer, nitrogen inlet tube, and Dean-Stark trap were placed 231.5 parts of epsilon-caprolactam (6-hexanelactam), 78.7 parts of phosphoric acid and 606.4 parts of butanol. The aforesaid mixture was placed under nitrogen atmosphere, heated to reflux to azeotropically remove any water present, and maintained at reflux until a constant acid value was attained. (The acid value was determined by the procedure described in Example I, above.) The reaction mixture was allowed to cool to 60° C. followed by the addition of 595.2 parts of methanol over a five-minute period. The mixture was stirred and filtered to yield the [(5-butoxycarbonyl)pentyl]ammonium phosphate. The aforesaid latent acid catalyst had a solids content of 30 percent in methanol and butanol.

EXAMPLE XI

This example illustrates some physical properties of cured films of a polyester resin based coating composition incorporating the catalysts prepared in the preceding Examples, above. The base coating composition employed was prepared in the following manner:

| Ingredients | Parts by Weight | Percent of Resin Solids |
|---|---|---|
| Polyester polyol[1] | 667 | 57 |
| Crosslinking agent[2] | 400 | 38 |
| Epoxy resin[3] | 50 | 5 |

-continued

| Ingredients | Parts by Weight | Percent of Resin Solids |
| --- | --- | --- |
| Methyl amyl ketone | 283 | |

[1] This polyester polyol was prepared from trimethylpentanediol, adipic acid, and isophthalic acid. It was thinned to a resin solids content of 90 percent in ethylene glycol monoethyl ether acetate.
[2] A methylated melamine-formaldehyde condensation product, commercially available as CYMEL 303 from American Cyanamid Co.
[3] A condensation product of epichlorohydrin and bisphenol A, commercially available as EPON 1001 from Shell Chemical Co.

The various catalyst-containing coating compositions were prepared by mixing 140.0 parts of the aforesaid base coating composition with an amount of each of the catalysts to give 0.006 equivalents of acid.

The catalyst-containing compositions were applied with a 0.003 BIRD APPLICATOR on cold rolled steel panels treated with BONDERITE 40 (commercially available from Hooker Chemical Co.). The films were baked at 150° C. for 15 minutes and also at 180° C. for 15 minutes. The following coatings properties were observed.

|  | Baked at 150° C. for 15 Minutes | | Baked at 180° C. for 15 Minutes | |
| --- | --- | --- | --- | --- |
| Catalyst | Solvent Resistance 50 Double Rubs with Xylene | Pencil Hardness | Solvent Resistance 50 Double Rubs with Xylene | Pencil Hardness |
| [(5-butoxycarbonyl)pentyl] ammonium tosylate | PASS | F | PASS | H |
| [(4-butoxycarbonyl)butyl] ammonium tosylate | PASS | F | PASS | H |
| [(5-butoxycarbonyl)pentyl ammonium dodecylbenzenesulfonate | PASS | F | PASS | 2H |
| [(5-methoxycarbonyl)pentyl] ammonium tosylate | PASS | F | PASS | H |
| [(3-butoxycarbonyl)propyl] ammonium tosylate | PASS | H | PASS | H |
| di[[(5-isobutoxycarbonyl)pentyl]ammonium] dinonylnaphthalenedisulfonate | PASS | F | PASS | H |
| para-toluenesulfonic acid | PASS | F | PASS | 2H |

Solvent Resistance was evaluated after each coated panel underwent 50 double rubs with a xylene soaked cloth. A "pass" rating indicated that no coating was removed from the panel.

Pencil Hardness was a measure of the resistance of the coating to a pencil indentor. The hardness scale is as follows beginning with 4B which indicates a relatively soft coating and increasing to 10H which indicates a relatively hard coating:

4B, 3B, 2B, B, HB, F, H, 2H, 3H . . . up to 10H.

EXAMPLE XII

This example illustrates some physical properties of cured films of an acrylic resin based coating composition incorporating the catalysts prepared in the preceding Examples, above. The base coating composition employed was prepared in the following manner:

| Ingredients | Parts by Weight | Percent of Resin Solids |
| --- | --- | --- |
| Acrylic polyol[1] | 1200 | 60 |
| Crosslinking agent[2] | 600 | 40 |
| Methyl amyl ketone | 343 | |

[1] This acrylic polyol is commercially available from Rohm and Haas Corp. as ACRYLOID AT-400C. It had a hydroxyl number of 67 and was thinned to resin solids content of 75 percent in cellosolve acetate.
[2] A methylated melamine-formaldehyde condensation product, commercially available as CYMEL 303 from American Cyanamid Co.

The various catalyst-containing coating compositions were prepared by mixing 150.0 parts of the aforesaid base coating composition with an amount of each of the catalysts to give 0.006 equivalents of acid.

The catalyst-containing compositions were applied with a 0.003 BIRD APPLICATOR on cold rolled steel panels treated with BONDERITE 40 (commercially available from Hooker Chemical Co.). The films were baked at 120° C. for 30 minutes. The following coatings properties were observed. The meaning of the measurements is explained in Example XI, above.

|  | Baked at 120° C. for 30 Minutes | | Baked at 150° C. for 30 Minutes | |
| --- | --- | --- | --- | --- |
| Catalyst | Solvent Resistance 50 Double Rubs with Xylene | Pencil Hardness | Solvent Resistance 50 Double Rubs with Xylene | Pencil Hardness |
| [(5-butoxycarbonyl)pentyl] ammonium tosylate | PASS | H | | |
| [(4-butoxycarbonyl)butyl] ammonium tosylate | PASS | H | | |
| [(5-butoxycarbonyl)pentyl] ammonium dodecylbenzenesulfonate | PASS | H | | |
| [(5-methoxycarbonyl)pentyl] ammonium tosylate | PASS | H | | |
| [(3-butoxycarbonyl)propyl] ammonium tosylate | PASS | H | | |
| di[[(5-isobutoxycarbonyl)pentyl]ammonium] dinonylnaphthalenedisulfonate | PASS | H | | |
| [(5-butoxycarbonyl)pentyl] ammonium sulfate | PASS | H | | |
| dimethylaminoethylmethacrylate para-toluenesulfonate | PASS | 2H | | |
| [(5-butoxycarbonyl)pentyl] | | | PASS | F |

| Catalyst | Baked at 120° C. for 30 Minutes | | Baked at 150° C. for 30 Minutes | |
|---|---|---|---|---|
| | Solvent Resistance 50 Double Rubs with Xylene | Pencil Hardness | Solvent Resistance 50 Double Rubs with Xylene | Pencil Hardness |
| ammonium hydrogen phosphate [(5-butoxycarbonyl)pentyl] ammonium phosphate | | | PASS | H |
| para-toluenesulfonic acid | PASS | H | | |

Although the invention has been described with specific references and specific details of embodiments thereof, it is to be understood that it is not intended to be so limited since changes and alterations therein may be made by those skilled in the art which are within the full intended scope of this invention as defined by the appended claims.

What is claimed is:

1. In a curable composition which is capable of acid catalyzed crosslinking, comprising an active hydrogen-containing resin, a crosslinking agent present externally and/or internally as a part of the active hydrogen containing resin, and an acid catalyst, wherein the improvement in curing comprises using as the acid catalyst a catalytic amount of a latent acid catalyst represented by either of the following structural formulas:

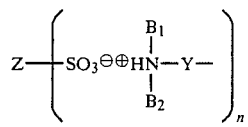  (I)

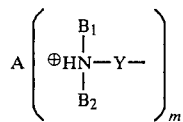  (II)

wherein:

Z is a $C_1$ to $C_{12}$ alkyl radical, a $C_5$ to $C_{12}$ cycloalkyl radical, or a $C_6$ to $C_{28}$ aromatic radical; $B_1$ and $B_2$ are independently hydrogen, a $C_1$ to $C_{18}$ alkyl radical, a $C_5$ to $C_{12}$ cycloalkyl radical, or a $C_6$ to $C_{10}$ aromatic radical;

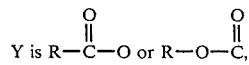

wherein
R is a $C_2$ to $C_{12}$ alkylene radical, or a $C_8$ to $C_{16}$ arylene radical;
A is $SO_4^{-2}$, $HSO_4^-$, $PO_4^{-3}$, $HPO_4^{-2}$, or $H_2PO_4^-$;
n is an integer from 1 to 3; and
m is an integer from 1 to 3.

2. The composition of claim 1 wherein Z is a $C_6$ to $C_{28}$ aromatic radical, $B_1$ and $B_2$ are both hydrogen, and Y is

wherein R is a $C_2$ to $C_{12}$ alkylene radical.

3. The composition of claim 2 wherein n is 1.
4. The composition of claim 2 wherein n is 2.

5. The curable composition of claim 3 wherein the latent acid catalyst is [(5-butoxycarbonyl)pentyl]ammonium tosylate.

6. The curable composition of claim 3 wherein the latent acid catalyst is [(4-butoxycarbonyl)butyl]ammonium tosylate.

7. The curable composition of claim 3 wherein the latent acid catalyst is [(5-methoxycarbonyl)pentyl]ammonium tosylate.

8. The curable composition of claim 3 wherein the latent acid catalyst is [(3-butoxycarbonyl)propyl]ammonium tosylate.

9. The curable composition of claim 3 wherein the latent acid catalyst is [(5-butoxycarbonyl)pentyl]ammonium dodecylbenzenesulfonate.

10. The curable composition of claim 4 wherein the latent acid catalyst is di[[(5-isobutoxycarbonyl)pentyl-]ammonium]dinonylnaphthalenedisulfonate.

11. The curable composition of claim 1 wherein the latent acid catalyst is [(5-butoxycarbonyl)pentyl]ammonium sulfate.

12. The curable composition of claim 1 wherein the latent acid catalyst is [(5-butoxycarbonyl)pentyl]ammonium hydrogen phosphate.

13. The curable composition of claim 1 wherein the latent acid catalyst is [(5-butoxycarbonyl)pentyl]ammonium phosphate.

14. The curable composition of claim 1 wherein the latent acid catalyst is dimethylaminoethylmethacrylate para-toluenesulfonate.

15. In a curable composition which is capable of acid catalyzed crosslinking, comprising an active hydrogen-containing resin, a crosslinking agent present externally and/or internally as a part of the active hydrogen-containing resin and an acid catalyst, wherein the improvement in curing comprises using as the acid catalyst a catalytic amount of a latent acid catalyst which is the reaction product of a member selected from the group consisting of a lactam, an amino acid, an amino ester and an aminoalkyl ester; an alcohol or water; and a member selected from the group consisting of a sulfonic acid, sulfuric acid, and phosphoric acid.

16. The composition of claim 15 wherein the latent acid catalyst is the reaction product of a lactam, an alcohol or water, and a sulfonic acid.

17. The curable composition of claim 16 wherein the lactam is represented by the following structural formula:

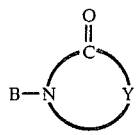

wherein
Y is a $C_3$ to $C_{12}$ alkylene radical, or a $C_8$ to $C_{16}$ arylene radical; and B is independently hydrogen, a $C_1$ to $C_{18}$ alkyl radical, a $C_5$ to $C_{12}$ cycloalkyl radical or a $C_6$ to $C_{10}$ aromatic radical.

18. The curable composition of claim 17 wherein the lactam is selected from the group consisting of 6-hexanelactam, 5-pentanelactam, 4-butanelactam, N-methyl 4-butanelactam, and 12-dodecanelactam.

19. The curable composition of claim 18 wherein the lactam is 6-hexanelactam.

20. The composition of claim 16 wherein the alcohol is a monofunctional alcohol of the structural formula ROH wherein R is a $C_1$ to $C_{18}$ alkyl radical, a $C_5$ to $C_{18}$ cycloalkyl radical, a $C_6$ to $C_{18}$ aromatic radical, or a $C_5$ to $C_{10}$ heterocyclic radical.

21. The curable composition of claim 16 wherein the sulfonic acid is represented by the structural formula $$Z(SO_3H)_n$$

wherein

Z is a $C_1$ to $C_{12}$ alkyl radical, $C_5$ to $C_{12}$ cycloalkyl radical or a $C_6$ to $C_{28}$ aromatic radical, and n is an integer from 1 to 3.

22. The curable composition of claim 21 wherein the sulfonic acid is selected from the group consisting of para-toluenesulfonic acid, methanesulfonic acid, dodecylbenzenesulfonic acid, and dinonylnaphthalenedisulfonic acid.

23. The composition of claim 1 wherein the amount of latent acid catalyst ranges from about 0.1 percent by weight to about 10 percent by weight based on the resinous components of the composition.

24. In a curable composition which is capable of acid catalyzed crosslinking, comprising a polyester polyol, an aminoplast crosslinking agent and an acid catalyst, wherein the improvement in curing comprises using as the acid catalyst a catalytic amount of a latent acid catalyst which is the reaction product of 6-hexanelactam, an alcohol, and a sulfonic acid.

* * * * *